United States Patent
Jang et al.

(10) Patent No.: US 10,551,096 B2
(45) Date of Patent: Feb. 4, 2020

(54) COMBINED HEAT AND POWER SYSTEM WITH ENERGY CONTROL MODULE

(71) Applicant: KITURAMI CO., LTD., Cheongdo-gun, Gyeongsangbuk-do (KR)

(72) Inventors: Gi-Hyun Jang, Incheon (KR); Ki-Hwan Nam, Bucheon-si (KR); Jong-Hyun Shin, Incheon (KR); Jong-Seok Park, Bucheon-si (KR); Young-Hwan Choi, Seoul (KR)

(73) Assignee: KITURAMI CO., LTD., Cheongdo-gun (KR)

(*) Notice: Subject to any disclaimer, the term of this patent is extended or adjusted under 35 U.S.C. 154(b) by 0 days.

(21) Appl. No.: 15/992,884

(22) Filed: May 30, 2018

(65) Prior Publication Data
US 2019/0360729 A1    Nov. 28, 2019

(30) Foreign Application Priority Data

May 23, 2018 (KR) ........................ 10-2018-0058267

(51) Int. Cl.
| | | |
|---|---|---|
| F25B 25/00 | (2006.01) | |
| F25B 27/02 | (2006.01) | |
| F02C 6/18 | (2006.01) | |
| F01K 13/00 | (2006.01) | |
| F01K 25/08 | (2006.01) | |

(52) U.S. Cl.
CPC ............ *F25B 25/005* (2013.01); *F25B 27/02* (2013.01); *F01K 13/00* (2013.01); *F01K 25/08* (2013.01); *F02C 6/18* (2013.01)

(58) Field of Classification Search
CPC ........ F25B 25/005; F25B 27/02; F01K 25/08; F01K 13/00; F02C 6/18
USPC .................................................. 60/614–624
See application file for complete search history.

(56) References Cited

U.S. PATENT DOCUMENTS

| | | | | |
|---|---|---|---|---|
| 6,250,080 B1* | 6/2001 | Shelor | ...................... | F02G 5/00 60/618 |
| 6,909,349 B1* | 6/2005 | Longardner | ............ | F25B 15/00 336/60 |
| 7,891,186 B1* | 2/2011 | Primlani | ............... | F01K 23/065 60/597 |
| 2003/0182944 A1* | 10/2003 | Hoffman | ................. | F01K 23/10 60/772 |
| 2003/0236593 A1* | 12/2003 | Schumacher | ............. | H02J 3/14 700/291 |
| 2013/0118192 A1* | 5/2013 | Shi | .......................... | F25B 15/00 62/89 |
| 2015/0143806 A1* | 5/2015 | Friesth | ...................... | F01K 3/00 60/517 |

* cited by examiner

*Primary Examiner* — Hoang M Nguyen
(74) *Attorney, Agent, or Firm* — Studebaker & Brakett PC (57) ABSTRACT

The present invention relates to a combined heat and power system with an energy control module. The system can easily increase the temperature of waste heat generated by a power generator or can easily increase the temperature of recovered heat recovered to the power generator.

8 Claims, 5 Drawing Sheets

COMBINED HEAT AND POWER SYSTEM WITH ENERGY CONTROL MODULE

CROSS REFERENCE TO RELATED APPLICATION

The present application claims priority to Korean Patent Application No. 10-2018-0058267, filed May 23, 2018, the entire contents of which is incorporated herein for all purposes by this reference.

BACKGROUND OF THE INVENTION

Field of the Invention

The present invention relates to a combined heat and power system with an energy control module and, more particularly, to a combined heat and power system with an energy control module that can control the temperature of waste heat from a power generator or the temperature of recovered heat coming back to the power generator.

Description of the Related Art

In general, a combined heat and power (CHP) (cogeneration or co-gen) system is a system increasing efficiency of using energy by producing both of power and heating energy from one energy source. This system is used for district heating and there have been a lot of studies on the system, but there is a problem that the efficiency of using this system is reduced in summer time with less demand for heating and the system is less used in low-altitude areas having high average annual temperature. So, a combined cooling, heat and power (CCHP) (tri-generation or tri-gen) system that produces all of power and heating and cooling energy has been introduced. The combined cooling, heat and power system is a system that produces cooling energy by restoring wasted heat in cogeneration by additionally using a thermally activated machine in the existing tri-generation system. This system has the advantages of being able to use thermal energy, depending on seasonal characteristics and of producing fewer environment contamination factors and having high efficiency of energy use in comparison to the existing combined heat and power system. Further, apartment buildings, office buildings, and small-scaled factory complexes that consume a large amount of electrical energy and thermal energy are supplied with electrical energy from a power company, but a loss of electricity is large in transmission of electricity occurs because the electricity is generated a long distance from where it is used. Further, heating or cooling energy is irregularly and intermittently supplied because they are consumed by boilers or air conditioners in those buildings and complexes, thus the thermal efficiency is very low. A combined cooling, heat and power system has been designed to solve the problems of a loss during power generation and reduction of thermal energy efficiency. A combined heat and power system supplying both of thermal energy and electrical energy can reduce the costs for constructing a large-scaled power plant, as compared with common power generation systems having a large loss of electricity due to long-distance transmission of electricity. Further, the combined heat and power system has a small loss of electricity in the process of transmitting electricity and can immediately deal with demand for energy because it employs a distributed generation type that directly supplies electricity at the places requiring energy such as electricity. Further, the combined cooling, heat and power system, which is a technology that improves energy efficiency by restoring and using wasted heat (discharged heat) that is unavoidably produced in the process of receiving fuel and generating electricity through a power generator, is a general energy system that produces both of power and heat that are secondary energy from one primary energy source and had the advantage of being eco-friendly and saving more energy by saving energy such as power and fuel by 30-40% in comparison to the power generation type using a large-scaled power generation system. Recently, this type of power generation is increasingly used by apartment buildings, office buildings, and small-scaled and medium-scaled industrial complexes, and a gas cogeneration system using gas such as LNG as fuel and a combined cooling, heat and power generation system dealing with the demand for heating in the summer season by using an absorption chiller that uses wasted heat are eco-friendly system and allow for managing demand depending on seasons by using gas in the summer time at which the demand for electricity is the highest.

The combined cooling, heat and power system of the related art has a problem that the capacity of the absorption chiller unavoidably depends on the hot water temperature, the flow rate, and the energy of the system.

A combined heat and power system generates electrical energy by operating an engine generator and supplies hot water and heat for heating, using engine cooling water and discharged heat that are produced by operation of an internal combustion engine, and cooling water of the power generator. The combined heat and power system generates electricity by operating a power generator in an engine and obtains thermal energy by sensing high-temperature exhaust gas discharged from the engine to a discharged-heat restoring heat exchanger. The combined heat and power system for restoring and using thermal energy includes a primary system (cooling water circulation) for circulating cooling water of an engine, a secondary system (circulating water circulation) that is a storage tank such as an auxiliary heat exchanger or a thermal storage tank, and an indirect heat exchanger (cooling water and circulating water) for heat exchange between the primary system and the secondary system. The cooling water takes thermal energy by cooling the engine and also takes thermal energy from the discharged-heat restoring heat exchanger for heat exchange with the exhaust gas discharged from the engine, whereby it can obtain high-temperature thermal energy. In the power generator, the system for using cooling water allows for reducing the size of the power generator and decreasing the space for the power generator. The high-temperature cooling water transmits heat to low-temperature thermal medium by exchanging heat through the indirect heat exchanger and the thermal energy transmitted through the indirect heat exchanger moves to the part that uses hot water through the thermal storage tank. Since the combined heat and power system includes the discharged-heat restoring heat exchanger and the indirect heat exchanger, heat can be transferred. The device for operating the power generator of the combined heat and power system may be a device that converts chemical energy of fuel into electrical energy, using various motors such as an internal combustion engine, a gas turbine, a fuel cell, and a Stirling engine.

When the recovering temperature is too high in the combined heat and power system, the operation of the system may be stopped due to overheating.

SUMMARY OF THE INVENTION

In order to solve the problems in the related art, an object of the present invention is to provide a combined heat and power system with an energy control module that freely increases the temperature of waste heat produced by a power generator or freely decreases the temperature of recovered heat coming back to the power generator.

In order to achieve the objects, an aspect of the present invention provides a combined heat and power system with an energy control module, the system including: a power generator producing electricity, using fuel; a waste heat restoring unit performing cooling, making hot water, or heating, using waste heat generated by the power generator; a heat source supply unit disposed between the power generator and the waste heat restoring unit and supplying waste heat generated by the power generator to the waste heat restoring unit after controlling temperature of the waste heat; and an energy control module transmitting waste heat generated by the power generator to the heat source supply unit or the waste heat restoring unit.

The energy control module may include: a first 3-way valve having a waste heat inlet, a first waste heat outlet, and a second waste heat outlet; a first waste heat supply line receiving waste heat from the power generator and transmitting the waste heat to the waste heat inlet; a second waste heat supply line allowing for heat exchange between waste heat discharged to the first waste heat outlet and the heat source supply unit; a third waste heat supply line connecting the second waste heat outlet and the waste heat restoring unit to each other; and a waste heat connection line connecting the second waste heat supply line and the third waste heat supply line to each other, and the first 3-way valve may control waste heat moving into the waste heat inlet from the power generator to be discharged to the first waste heat outlet or the second waste heat outlet.

The system further includes a recovered heat supply line receiving recovered heat from the waste heat restoring unit and supplying the recovered heat to the power generator, in which a first temperature sensor may be disposed on the first waste heat supply line, a second temperature sensor is disposed on the recovered heat supply line, a third temperature sensor may be disposed on the third waste heat supply line, a flowmeter may be disposed between the third temperature sensor on the third waste heat supply line and the second waste heat outlet, a fourth temperature sensor may be disposed closer to the waste heat restoring unit than the second temperature sensor on the recovered heat supply line, and the first 3-way valve may control waste heat transmitted to the waste heat inlet to be selectively discharged to the first waste heat outlet or the second waste heat outlet by comparing supply energy of the power generator calculated from a temperature difference between the first temperature sensor and the second temperature sensor and a flow rate measured by the flowmeter with current energy of the waste heat restoring unit calculated from a temperature difference between the third temperature sensor and the fourth temperature sensor and a flow rate measured by the flowmeter.

The heat source supply unit may include a boiler producing an auxiliary heat source, a heat exchanger receiving an auxiliary heat source from the heat source supply unit may be disposed between the first 3-way valve and the heat source supply unit, and waste heat moving through the second waste heat supply line may increase in temperature by exchanging heat with the heat exchanger.

The waste heat restoring unit may be an absorption chiller.

Another aspect of the present invention provides a combined heat and power system with an energy control module, the system including: a power generator producing electricity, using fuel; a waste heat restoring unit performing cooling, making hot water, or heating, using waste heat generated by the power generator; a heat source recovering unit disposed between the power generator and the waste heat restoring unit and supplying recovered heat from the waste heat restoring unit to the power generator after controlling temperature of the recovered heat; and an energy control module transmitting recovered heat from the waste heat restoring unit to the heat source recovering unit or the power generator.

The energy control module may include: a second 3-way valve having a recovered heat inlet, a first recovered heat outlet, and a second recovered heat outlet; a first recovered heat supply line receiving recovered heat from the waste heat restoring unit and transmitting the recovered heat to the recovered heat inlet; a second recovered heat supply line allowing for heat exchange between recovered heat discharged to the first recovered heat outlet and the heat source recovering unit; a third recovered heat supply line connecting the second recovered heat outlet and the power generator to each other; and a recovered heat connection line connecting the second recovered heat supply line and the third recovered heat supply line to each other, and the second 3-way valve may control recovered heat moving into the recovered heat inlet from the waste heat restoring unit to be discharged to the first recovered heat outlet or the second recovered heat outlet.

A temperature sensor may be disposed on the third recovered heat supply line, and the second 3-way valve may control recovered heat transmitted to the recovered heat inlet to be selectively discharged to the first recovered heat outlet or the second recovered heat outlet by comparing temperature of recovered heat measured by the temperature sensor with a predetermined critical temperature.

The heat source recovering unit may include a cooling tower through which cooling water flows, a heat exchanger receiving cooling water from the heat source recovering unit may be disposed between the second 3-way valve and the heat source recovering unit, and recovered heat moving through the second recovered heat supply line may increase in temperature by exchanging heat with the heat exchanger.

The waste heat restoring unit may be an absorption chiller.

According to the present invention, the temperature of waste heat supplied to a waste heat restoring unit from a power generator is controlled, so waste heat suitable for the temperature, flow rate, and energy required by the waste heat restoring unit is quickly supplied, and accordingly, the reliability of the waste heat provided by the power generator is improved.

Further, by freely controlling the temperature of recovered heat transmitted from the waste heat restoring unit to the power generator, when the receiving heat from the waste heat restoring unit is excessively high, the temperature of the receiving heat is freely reduced, so the power generator can be continuously operated regardless of the temperature of recovered heat from the waste heat restoring unit.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinafter, a combined heat and power system with an energy control module according to an exemplary embodiment of the present invention is described in detail with reference to the accompanying drawings.

Figure 1:
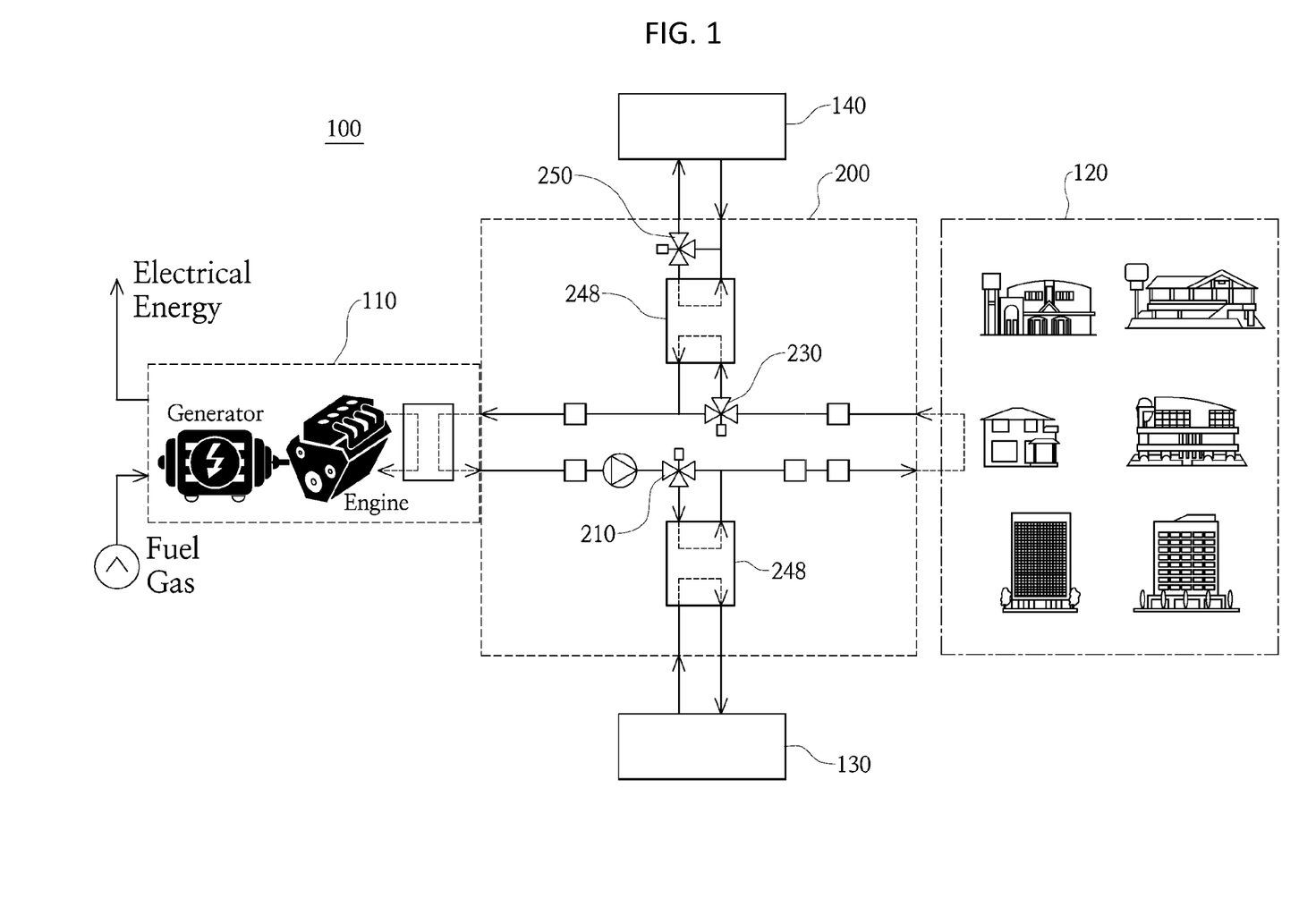
FIG. 1 is a diagram schematically showing a combined heat and power system with an energy control module according to an exemplary embodiment of the present invention.
Figure 2:
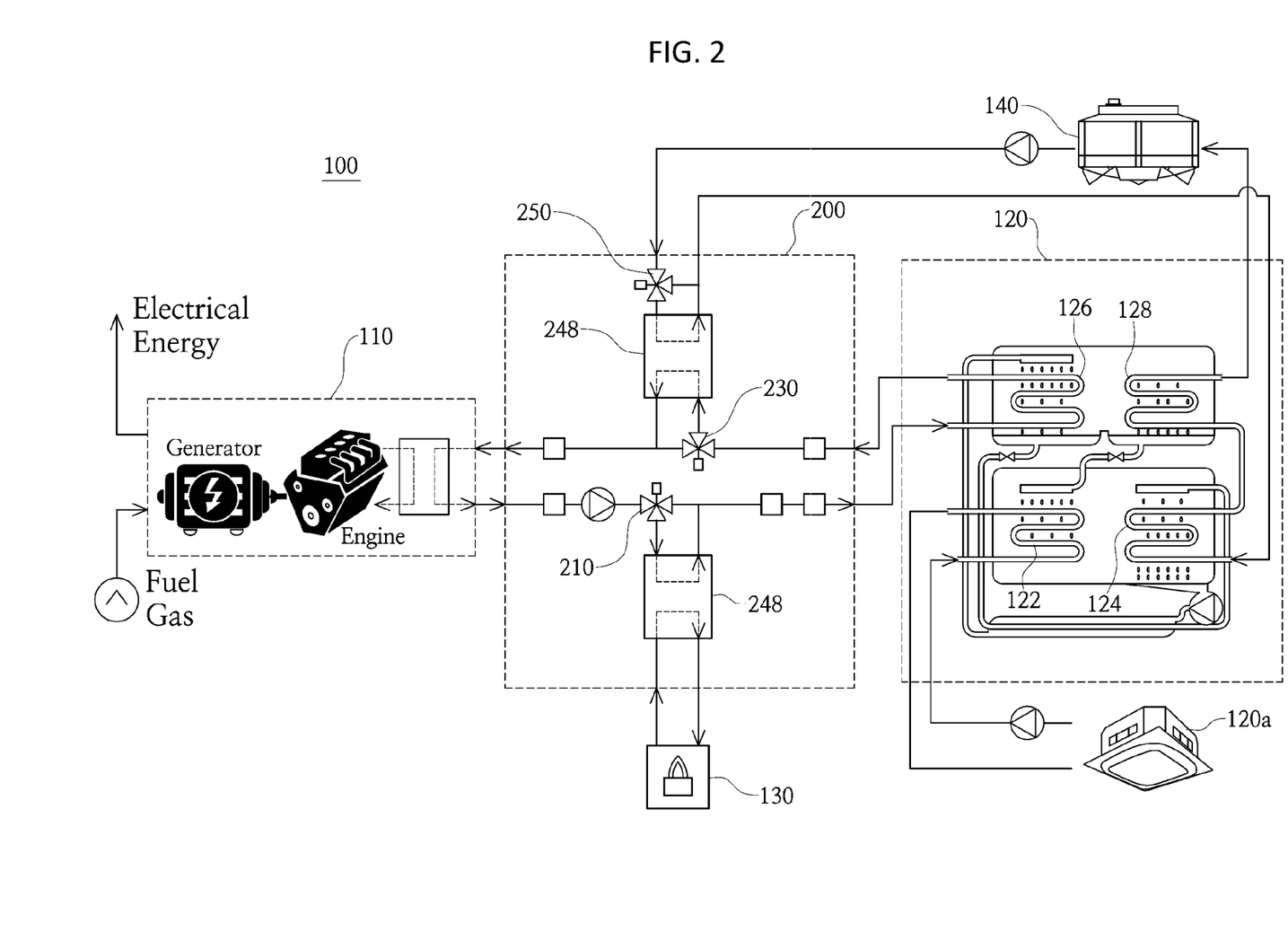
FIG. 2 is a diagram schematically showing an example of a waste heat restoring unit, heat source supply unit, and a heat source recovering unit in the combined heat and power system with an energy control module according to an exemplary embodiment of the present invention.

FIG. 1 is a diagram schematically showing a combined heat and power system with an energy control module according to an exemplary embodiment of the present invention and FIG. 2 is a diagram schematically showing an example of a waste heat restoring unit, heat source supply unit, and a heat source recovering unit in the combined heat and power system with an energy control module according to an exemplary embodiment of the present invention.

Referring to FIGS. 1 and 2, a combined heat and power system 100 with an energy control module according to an exemplary embodiment of the present invention includes a power generator 110, a waste heat restoring unit 120, a heat source supply unit 130, a heat source recovering unit 140, and an energy control module 200.

The power generator 110 produces electricity by operating an engine generator, using fuel such as gas, and provides waste heat produced by operation of the engine generator to the waste heat restoring unit 120 so that the waste heat is used for heating, making hot water, or cooling. The power generator 110 is given attention in terms of not only the efficiency of using energy, but stabilization of power supply. That is, when the power generator 110 is operated by using gas, electricity is generated from the power generator 110 and is supplied to each home such as common power from KEPCO, so power can be smoothly supplied.

The waste heat restoring unit 120 can be applied to places that require waste heat such as a home, a hotel, a sports center, a building, and a restaurant, and for example, it may be an absorption chiller, but the present invention is not limited thereto. The operation of an absorption chiller is briefly described hereafter. An absorption chiller includes an evaporator 122, an absorber 124, a regenerator 126, and a condenser 128. The evaporator 122 evaporates a refrigerant by exchanging heat with cold water and the absorber 124 absorbs refrigerant vapor produced by the evaporator 122 into an absorbent, and in this process, the refrigerant vapor becomes a thin solution by being absorbed into the absorbent, that is, a condensed solution containing lithium bromide. The regenerator 126 evaporates a refrigerant by heating the thin solution. Refrigerant vapor produced by the regenerator 126 is condensed by cooling water in the condenser 128, is injected into the evaporator 122, and exchanges heat with cold water, whereby it is circulated. The evaporator 122 is connected to an indoor air conditioner 120a and supplies cold water to the air conditioner 120a, whereby cooling is performed.

The heat source supply unit 130 is disposed at a side between the power generator 110 and the waste heat restoring unit 120 and supplies the waste heat produced by the power generator 110 to the waste heat restoring unit 120 after controlling the temperature of the waste heat. The heat source supply unit 130, for example, includes a boiler producing an auxiliary heat source, using gas.

The heat source recovering unit 140 is disposed at the other side between the power generator 110 and the waste heat restoring unit 120 and supplies the recovered heat from the waste heat restoring unit 120 to the power generator 110 after controlling the temperature of the recovered heat. The heat source recovering unit 140, for example, may include a cooling tower through which cooling water flows.

When regenerator 126 heats the thin solution, it uses the waste heat produced by the power generator 110. When the temperature of the waste heat is two low, the thin water is slowly heated, so it influences the performance or the capacity of the air conditioner 120a. In order to solve this problem, there are provided the heat source supply unit 130 and a first energy control module 202 of the energy control module 200 to freely decrease the temperature of waste heat, if necessary. Accordingly, waste heat suitable for temperature, a flow rate, and energy required by the absorption chiller is quickly supplied, so the reliability of the waste heat provided by the power generator 110 is improved.

The recovered heat recovered by the waste heat recovering unit 120 transfers to the power generator 110, but when the temperature of the recovered heat is too high, the power generator 110 may be stopped by overheating. In order to solve this problem, there are provided the heat source recovering unit 140 and a second energy control module 204 of the energy control module 200 to freely decrease the temperature of recovered heat, if necessary. Accordingly, the power generator 110 can be continuously operated regardless of the temperature of recovered heat from the waste heat restoring unit 120.

The first energy control module 202 and the second energy control module 204 are described hereafter.

Figure 3:
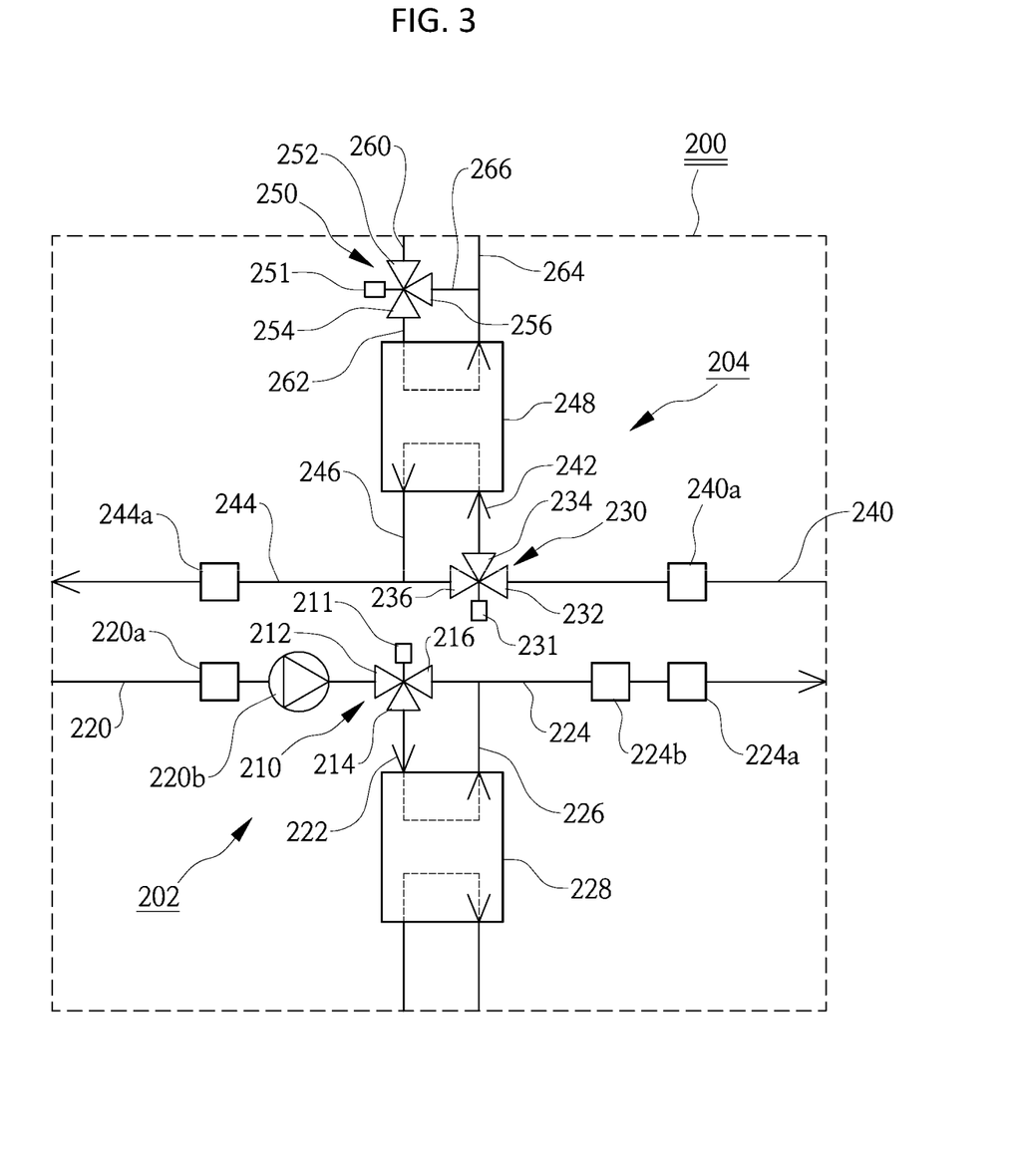
FIG. 3 is a diagram schematically showing an energy control module of the combined heat and power system with an energy control module according to an exemplary embodiment of the present invention.

FIG. 3 is a diagram schematically showing an energy control module of the combined heat and power system with an energy control module according to an exemplary embodiment of the present invention.

Referring to FIGS. 1 to 3, the energy control module 200 includes the first energy control module 202 and the second energy control module 204. The first energy control module 202, which selectively transmits the waste heat from the power generator 110 to the heat source supply unit 130 or the waste heat restoring unit 120, includes a first 3-way valve 210, a first waste heat supply line 220, a second waste heat supply line 222, a third waste heat supply line 224, a waste heat connection line 226, and a first heat exchanger 228.

The first 3-way valve 210 is provided to send fluid in three directions and includes a waste heat inlet 212, a first waste heat outlet 214, a second waste heat outlet 216, and a first controller 218. The first controller 218 of the first 3-way valve 210 controls the waste heat moving into the waste heat inlet 212 from the power generator 110 to be discharged to the first waste heat outlet 214 or the second waste heat outlet 216.

The first waste heat supply line 220 receives waste heat from the power generator 110 and transmits the waste heat to the waste heat inlet 212. The second waste heat supply line 222 allows for heat exchange between the waste heat discharged to the first waste heat outlet 214 and the heat source supply unit 130. The first heat exchanger 228 receiving an auxiliary heat source from the heat source supply unit 130 is disposed between the first 3-way valve 210 and the heat source supply unit 130, so the waste heat moving through the second waste heat supply line 222 is increased in temperature by exchanging heat with the first heat exchanger 228. The third waste heat supply line 224 connects the second waste heat outlet 216 and the waste heat restoring unit 120 to each other. The waste heat connection line 226 connects the second waste heat supply line 222 and the third waste heat supply line 224 to each other.

The first controller 218 of the first 3-way valve 210, as described above, controls the waste heat moving into the waste heat inlet 212 from the power generator 110 to be discharged to the first waste heat outlet 214 or the second waste heat outlet 216. To this end, a first temperature sensor 220a is disposed on the first waste heat supply line 220, a second temperature sensor 244a is disposed on a third recovered heat supply line 244 to be described below, a third temperature sensor 224a is disposed on the third waste heat supply line 224, and a flowmeter 224b is disposed between the third temperature sensor 224a on the third waste heat supply line 224 and the second waste heat inlet 216. A fourth temperature sensor 240a is disposed closer to the waste heat restoring unit 120 than the second temperature sensor 244a on the first recovered heat supply line 240.

The first controller 218 of the first 3-way valve 210 controls the waste heat transferring to the waste heat inlet 212 to be selectively discharged to the first waste heat outlet 214 or the second waste heat outlet 216 by comparing the supply energy of the power generator 110, which is calculated from the temperature difference between the first temperature sensor 220a and the second temperature sensor 244a and the flow rate measured by the flowmeter 244a, with the current energy of the waste heat restoring unit 120 which is calculated from the temperature difference between the third temperature sensor 224a and the fourth temperature sensor 240a and the flow rate measured by the flowmeter 224b. This will be described again with reference to FIG. 4.

A pump 220b is disposed between the first temperature sensor 220a on the first waste heat supply line 222 and the first 3-way valve 210. A pump controller (not shown) for controlling the pump 220b senses the flow rate of the waste heat supplied from the power generator, using the flowmeter 224b, and controls the amount of the waste heat pumped to the waste heat restoring unit 120 by the pump 220b by comparing flow rate information of waste heat sensed by the flowmeter 224b with flow rate information required by the waste heat restoring unit 120.

The second energy control module 204, which selectively transmits the recovered heat restored by the waste heat restoring unit 120 to the heat source supply unit 140 or the power generator, includes a second 3-way valve 230, a first recovered heat supply line 240, a second recovered heat supply line 242, a third recovered heat supply line 244, a recovered heat connection line 246, and second heat exchanger 248. The second 3-way valve 230 is provided to send fluid in three directions and includes a recovered heat inlet 232, a first recovered heat outlet 234, a second recovered heat outlet 236, and a second controller 238. The second controller 238 of the second 3-way valve 230 controls the recovered heat moving into the recovered heat inlet 232 from the power generator 120 to be discharged to the first recovered heat outlet 234 or the second recovered heat outlet 236.

The first recovered heat supply line 240 receives recovered heat from the waste heat restoring unit 120 and transmits the recovered heat to the recovered heat inlet 232. The second recovered heat supply line 242 allows for heat exchange between the recovered heat discharged to the first recovered heat outlet 234 and the heat source recovering unit 140. The second heat exchanger 248 receiving cooling water from the heat source recovering unit 140 is disposed between the second 3-way valve 230 and the heat source recovering unit 140, so the recovered heat moving through the second recovered heat supply line 242 is increased in temperature by exchanging heat with the second heat exchanger 248. The third recovered heat supply line 244 connects the second recovered heat outlet 236 and the power generator 110 to each other. The recovered heat connection line 246 connects the second recovered heat supply line 242 and the third recovered heat supply line 244 to each other.

The second 3-way valve 230, as described above, controls the recovered heat moving into the recovered heat inlet 232 from the waste heat restoring unit 120 to be discharged to the first recovered heat outlet 234 or the second recovered heat outlet 236. To this end, the second 3-way valve 230 controls the recovered heat transferring from the recovered heat inlet 232 to be selectively discharged to the first recovered heat outlet 234 or the second recovered heat outlet 236 by comparing the temperature of the recovered heat measured by the second temperature sensor 244a and a predetermined critical temperature. This will be described again with reference to FIG. 5.

The second energy control module 204 further includes a third 3-way valve 250, a first cooling line supply line 270, a second cooling water supply line 272, a third cooling water supply line 274, and a cooling water connection line 276. The third 3-way valve 250 is provided to send fluid in three directions and includes a cooling water inlet 252, a first cooling water outlet 254, a second cooling water outlet 256, and a third controller 258. The third controller 258 of the third 3-way valve 250 controls the cooling water moving into the cooling water inlet 254 from the cooling water restoring unit 252 to be discharged to the first cooling water outlet 256 or the second cooling water outlet 216.

The first cooling water supply line 270 receives cooling water from the heat source recovering unit 140 and transmits the cooling water to the cooling water inlet 252. The second cooling water supply line 272 allows for heat exchanged between the cooling water discharged to the first cooling water outlet 254 and the recovered heat supplied to the second heat exchanger 248. That is, the cooling water moving through the second cooling water supply line 272 decreases the temperature of the recovered heat supplied to the second heat exchanger 248 through the recovered heat supply line 242. The third cooling water supply line 274 connects the second cooling water outlet 256 and the heat source recovering unit 140 to each other. The cooling water connection line 276 connects the second cooling water supply line 272 and the third cooling water supply line 274 to each other.

The third controller 258 of the third 3-way valve 250 controls the cooling water sent to the cooling water inlet 252 to be selectively discharged to the first cooling water outlet 254 or the second cooling water outlet 256, using the temperature difference between the fourth temperature sensor 240a and the second temperature sensor 244a.

Figure 4:
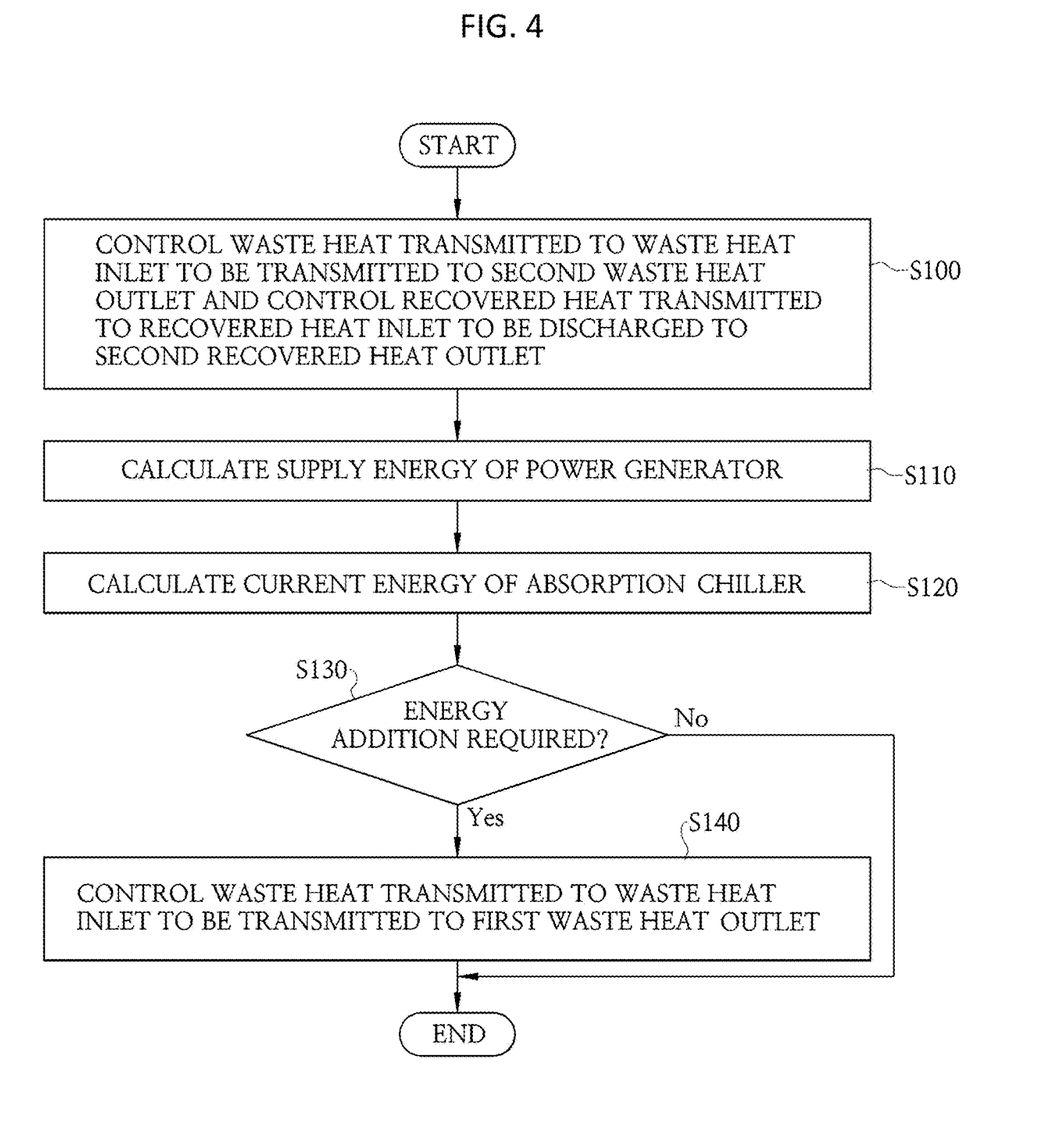
FIG. 4 is a diagram schematically showing a first controller of an energy control module of the combined heat and power system with an energy control module according to an exemplary embodiment of the present invention.

The operation of the combined heat and power system with an energy control module according to an exemplary embodiment of the present invention is described hereafter. FIG. 4 is a diagram schematically showing a first controller of an energy control module of the combined heat and power system with an energy control module according to an exemplary embodiment of the present invention.

Referring to FIGS. 1 to 4, first, the first controller 218 of the energy control module 200 opens the waste heat inlet 212 and the second waste heat outlet 216 and closes the first waste heat outlet 214. Then, the waste heat moving to the waste heat inlet 212 is discharged to the second waste heat outlet 216, so the waste heat of the power generator 110 is directly transmitted to the waste heat restoring unit 120 (S100).

The first controller 218 calculates the supply energy of the power generator 110 from the temperature difference between the first temperature sensor 220a and the third temperature sensor 244a and the flow rate measured by the flowmeter 224b.

The first controller 218 calculates the current energy of the waste heat restoring unit 120 from the temperature difference between the third temperature sensor 224a and the fourth temperature sensor 240a and the flow rate measured by the flowmeter 224b (S120). Next, the first controller 218 compares the supply energy and the current energy with each other (S130). When the supply energy is less than the current energy, the first controller 218 determines that the supply energy that is supplied by the power generator 110 is lower than the current energy that is required by the absorption chiller of the waste heat restoring unit 120. Further, the first controller 218 opens the waste heat inlet 212 and the first waste heat outlet 214 and closes the second waste heat outlet 216 (S140).

Accordingly, the waste heat transmitted to the waste heat inlet 212 is discharged to the first waste heat outlet 214 (S120) and the waste heat of the power generator 110 is supplied to the heat source supply unit 130. Further, the heat source supply unit 130 increases the temperature of the waste heat of the power generator 110 to the level that is required by the absorption chiller of the waste heat restoring unit 120 and then supplies the waste heat to the absorption chiller of the waste heat restoring unit 120.

Figure 5:
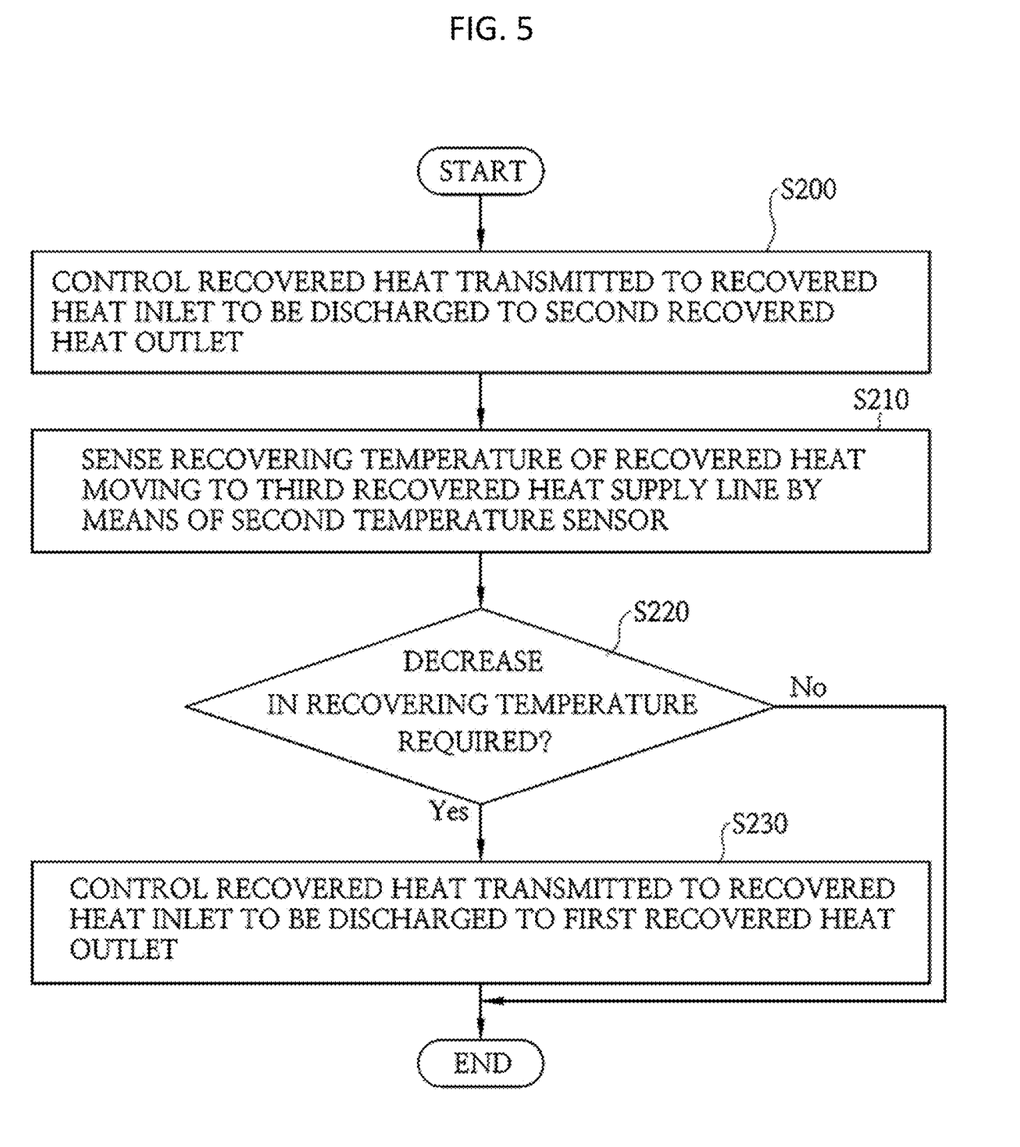
FIG. 5 is a diagram schematically showing a second controller of an energy control module of the combined heat and power system with an energy control module according to an exemplary embodiment of the present invention.

FIG. 5 is a diagram schematically showing a second controller of an energy control module of the combined heat and power system with an energy control module according to an exemplary embodiment of the present invention.

Referring to FIGS. 1, 2, 3, and 5, first, the second controller 238 of the energy control module 200 opens the recovered heat inlet 232 and the second recovered heat outlet 236 and closes the first recovered heat outlet 234. Accordingly, the recovered heat transmitted to the recovered heat inlet 232 is discharged to the second recovered heat outlet 236 (S200), so the recovered heat from the waste heat restoring unit 120 is directly transmitted to the power generator 110.

The second controller 238 receives temperature of the recovered heat measured by the second temperature sensor 244a (S210) and compares the temperature of the recovered heat with a predetermined critical temperature (S220). When the temperature of the recovered heat transmitted to the recovered heat inlet 232 exceeds the critical temperature, the second controller 238 determines that the temperature of the recovered heat currently supply by the waste heat restoring unit 120 is higher than temperature that is required by the power generator 110. Further, the second controller 238 opens the recovered heat inlet 232 and the first recovered heat outlet 234 and closes the second recovered heat outlet 236 (S230). Accordingly, the recovered heat transmitted to the recovered heat inlet 232 is discharged to the first recovered heat outlet 234 and the recovered heat from the waste heat restoring unit 120 exchanges heat with the heat source recovering unit 140, so the recovered heat from the waste heat restoring unit 120 increases in temperature up to the level required by the power generator 110.

Although the present invention was described above with reference to the embodiment, the present invention is not limited to the embodiment and it is apparent to those skilled in the art that the present invention may be changed and modified in various ways within the scope of the present invention. Further, the changes and modifications should be construed as being included in the present invention if they belong to the range of the claims.

What is claimed is:

1. A combined heat and power system with an energy control module, the system comprising:
   a power generator producing electricity, using fuel;
   a waste heat restoring unit performing cooling, making hot water, or heating, using waste heat generated by the power generator;
   a heat source supply unit disposed between the power generator and the waste heat restoring unit and supplying waste heat generated by the power generator to the waste heat restoring unit after controlling temperature of the waste heat; and
   an energy control module transmitting waste heat generated by the power generator to the heat source supply unit or the waste heat restoring unit,
   wherein the waste heat restoring unit is an absorption chiller.

2. The system of claim 1, wherein the energy control module includes:
   a first 3-way valve having a waste heat inlet, a first waste heat outlet, and a second waste heat outlet;
   a first waste heat supply line receiving waste heat from the power generator and transmitting the waste heat to the waste heat inlet;
   a second waste heat supply line allowing for heat exchange between waste heat discharged to the first waste heat outlet and the heat source supply unit;
   a third waste heat supply line connecting the second waste heat outlet and the waste heat restoring unit to each other; and
   a waste heat connection line connecting the second waste heat supply line and the third waste heat supply line to each other, and
   the first 3-way valve controls waste heat moving into the waste heat inlet from the power generator to be discharged to the first waste heat outlet or the second waste heat outlet.

3. The system of claim 2, further comprising a recovered heat supply line receiving recovered heat from the waste heat restoring unit and supplying the recovered heat to the power generator,
   wherein a first temperature sensor is disposed on the first waste heat supply line,
   a second temperature sensor is disposed on the recovered heat supply line,
   a third temperature sensor is disposed on the third waste heat supply line,
   a flowmeter is disposed between the third temperature sensor on the third waste heat supply line and the second waste heat outlet,
   a fourth temperature sensor is disposed closer to the waste heat restoring unit than the second temperature sensor on the recovered heat supply line, and
   the first 3-way valve controls waste heat transmitted to the waste heat inlet to be selectively discharged to the first waste heat outlet or the second waste heat outlet by comparing supply energy of the power generator calculated from a temperature difference between the first temperature sensor and the second temperature sensor and a flow rate measured by the flowmeter with current energy of the waste heat restoring unit calculated from a temperature difference between the third temperature sensor and the fourth temperature sensor and a flow rate measured by the flowmeter.

4. The system of claim 2, wherein the heat source supply unit includes a boiler producing an auxiliary heat source,
a heat exchanger receiving an auxiliary heat source from the heat source supply unit is disposed between the first 3-way valve and the heat source supply unit, and
waste heat moving through the second waste heat supply line increases in temperature by exchanging heat with the heat exchanger.

5. A combined heat and power system with an energy control module, the system comprising:
a power generator producing electricity, using fuel;
a waste heat restoring unit performing cooling, making hot water, or heating, using waste heat generated by the power generator;
a heat source recovering unit disposed between the power generator and the waste heat restoring unit and supplying recovered heat from the waste heat restoring unit to the power generator after controlling temperature of the recovered heat, wherein the heat source recovering unit includes a cooling tower through which cooling water flows;
an energy control module transmitting recovered heat from the waste heat restoring unit to the heat source recovering unit or the power generator; and
a heat exchanger receiving cooling water from the heat source recovering unit, wherein the heat exchanger is disposed between a first 3-way valve and the heat source recovering unit, and recovered heat moving through a first recovered heat supply line increases in temperature by exchanging heat with the heat exchanger.

6. The system of claim 5, wherein the energy control module includes:
the first 3 way valve having a recovered heat inlet, a first recovered heat outlet, and a second recovered heat outlet;
the first recovered heat supply line allowing for heat exchange between recovered heat discharged to the first recovered heat outlet and the heat source recovering unit;
a second recovered heat supply line receiving recovered heat from the waste heat restoring unit and transmitting the recovered heat to the recovered heat inlet;
a third recovered heat supply line connecting the second recovered heat outlet and the power generator to each other; and
a recovered heat connection line connecting the first recovered heat supply line and the third recovered heat supply line to each other, and
the first 3 way valve controls recovered heat moving into the recovered heat inlet from the waste heat restoring unit to be discharged to the first recovered heat outlet or the second recovered heat outlet.

7. The system of claim 5, wherein a temperature sensor is disposed on the third recovered heat supply line, and
the first 3 way valve controls recovered heat transmitted to the recovered heat inlet to be selectively discharged to the first recovered heat outlet or the second recovered heat outlet by comparing temperature of recovered heat measured by the temperature sensor with a predetermined critical temperature.

8. The system of claim 5, wherein the waste heat restoring unit is an absorption chiller.

* * * * *